(12) United States Patent
Yu et al.

(10) Patent No.: US 11,598,355 B1
(45) Date of Patent: Mar. 7, 2023

(54) HOLDER

(71) Applicant: SHENZHEN LISEN TECHNOLOGY CO., LTD., Guangdong (CN)

(72) Inventors: Fan Yu, Guangdong (CN); Rufeng Yang, Guangdong (CN); Furuo Lei, Guangdong (CN)

(73) Assignee: SHENZHEN LISEN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/585,517

(22) Filed: Jan. 26, 2022

(30) Foreign Application Priority Data

Nov. 2, 2021 (CN) .......................... 202122663952.X

(51) Int. Cl.
| | | |
|---|---|---|
| *F16B 2/12* | (2006.01) | |
| *H04M 1/04* | (2006.01) | |
| *B60R 11/00* | (2006.01) | |
| *B60R 11/02* | (2006.01) | |

(52) U.S. Cl.
CPC ................. *F16B 2/12* (2013.01); *H04M 1/04* (2013.01); *B60R 11/0241* (2013.01); *B60R 2011/0071* (2013.01)

(58) Field of Classification Search
CPC ........ F16B 2/12; H04M 1/04; B60R 11/0241; B60R 2011/0071
See application file for complete search history.

(56) References Cited

U.S. PATENT DOCUMENTS

| | | | | |
|---|---|---|---|---|
| 10,492,322 | B1* | 11/2019 | Fan | H03K 17/96 |
| 10,598,199 | B1* | 3/2020 | Fan | F16M 13/022 |
| 10,711,812 | B2* | 7/2020 | Liu | H02J 50/10 |
| 10,948,001 | B2* | 3/2021 | Yang | F16B 2/12 |
| 11,027,665 | B1* | 6/2021 | Cao | B60R 11/0241 |
| 2007/0262223 | A1* | 11/2007 | Wang | B60R 11/0241 |
| | | | | 248/346.07 |
| 2020/0191178 | A1* | 6/2020 | Yang | F16B 2/12 |
| 2020/0282920 | A1* | 9/2020 | Yang | B60R 11/02 |

* cited by examiner

*Primary Examiner* — Anita M King

(57) ABSTRACT

A holder comprises a housing, a first clamping arm, a second clamping arm, a first elastic member and a second elastic member. The bottom of the housing is provided with a supporting arm. The first clamping arm is movably mounted in the housing and extends from one side of the housing to form a first clamping part and extends from the other side of the housing to form a first pressing part. The second clamping arm is arranged similarly, to form a second clamping part and a second pressing part; and the second clamping part is opposite to the first clamping part. The first elastic member is mounted in the housing to exert an elastic force towards the second clamping arm on the first clamping arm. The second elastic member is mounted in the housing to exert an elastic force towards the first clamping arm on the second clamping arm.

10 Claims, 5 Drawing Sheets

HOLDER

Cross Reference to Related Applications

The present application claims the benefit of Chinese Patent Application No. 202122663952.X filed on Nov. 2, 2021, the contents of which are incorporated herein by reference in their entirety.

Technical Field

The present invention relates to the technical field of holders, in particular to a holder.

Background Art

The holder is one of the common tools configured to clamp cell phones and tablets in daily life. The holder can greatly facilitate the user to use the cell phone freely. For example, in the process of driving, the cell phone is clamped with a vehicle-mounted holder, thereby facilitating the driver to check the cell phone navigation at any time, etc.

The current holder is troublesome to clamp and difficult to operate with one hand.

SUMMARY OF THE INVENTION

The present invention aims at providing a holder which is convenient to clamp and easy to operate with one hand.

The present invention discloses a holder, including a housing, a first clamping arm, a second clamping arm, a first elastic member and a second elastic member. The bottom of the housing is provided with a supporting arm. The first clamping arm is movably mounted in the housing and extends from one side of the housing to form a first clamping part and extends from the other side of the housing to form a first pressing part. The second clamping arm is movably mounted in the housing and extends from one side of the housing to form a second clamping part and extends from the other side of the housing to form a second pressing part; and the second clamping part is opposite to the first clamping part. The first elastic member is mounted in the housing and is connected to the first clamping arm to exert an elastic force towards the second clamping arm on the first clamping arm. The second elastic member is mounted in the housing and connected to the second clamping arm to exert an elastic force towards the first clamping arm on the second clamping arm.

The first clamping arm, the second clamping arm and the supporting arm together limit a clamping position; the housing is provided with a locking mechanism, and the locking mechanism is located in the clamping position; wherein, when the first pressing part and the second pressing part are pressed to open the first clamping arm and the second clamping arm to their maximum opening, the locking mechanism locks the first clamping arm and the second clamping arm, and the locking mechanism is pressed to release the locking on the first clamping arm and the second clamping arm.

Optionally, the locking mechanism includes a pressing key, a locking block and a third elastic member; the pressing key is movably mounted on the housing, the locking block and the third elastic member are arranged in the housing, the third elastic member is connected to the locking block and the pressing key is abutted against the locking block; the first clamping arm is provided with a clamping opening; when the first clamping arm is opened to a maximum opening, the locking block is clamped into the clamping opening under the action of the third elastic member, to lock the first clamping arm; and the pressing key is pressed to push the locking block to be separated from the clamping opening, to release the locking on the first clamping arm.

Optionally, the locking block is provided with a limit column and the second clamping arm is provided with a limit slot; when the first clamping arm and the second clamping arm are opened to the maximum opening, the limit column is clamped into the limit slot under the action of the third elastic member to lock the second clamping arm; the pressing key is pressed to push the limit column to be separated from the limit slot to release the locking on the second clamping arm.

Optionally, the housing is provided with a mounting base, the mounting base is provided with a mounting column; the third elastic member is sleeved onto the mounting column, the locking block is movably mounted on the mounting column and limited in the mounting column, the locking block is abutted against the third elastic member; the mounting base is formed with an avoidance opening, and the limit column is located in the avoidance opening.

Optionally, the first clamping arm is provided with a first abutting part; and after the first clamping arm is unlocked, the first abutting part is abutted against the locking block.

Optionally, the second clamping arm is provided with a second abutting part; and after the second clamping arm is unlocked, the second abutting part is abutted against the limit column.

Optionally, the first clamping arm is arranged to be laminated on the second clamping arm; the first clamping arm is provided with a first sliding slot; the second clamping arm is provided with a first sliding rail; and the first sliding rail is embedded into the first sliding slot.

Optionally, the housing is provided with a second sliding rail, the first clamping arm is provided with a second sliding slot, the second clamping arm is provided with a third sliding slot, and the second sliding rail is embedded between the second sliding slot and the third sliding slot.

Optionally, the housing is provided with a depression at the position corresponding to the first pressing part and the second pressing part.

Optionally, two first clamping parts and two second clamping parts are available; the first pressing part is arranged between the two second clamping parts, and the second pressing part is arranged between the two first clamping parts.

During the whole clamping process of the holder in the present invention, the user can open the first clamping arm and the second clamping arm with one hand, and then use the self weight of the clamped objects such as a cell phone to abut against the locking mechanism to achieve unlocking and clamping, thereby achieving operation with one hand, and the use is convenient.

BRIEF DESCRIPTION OF THE DRAWINGS

The included accompanying drawings provide further understanding of embodiments of the present invention, which form part of the specification, to illustrate execution modes of the present invention, and to illustrate principles of the present invention together with the text description. Apparently, the accompanying drawings in the following description are merely some embodiments of the present invention, and other accompanying drawings may be obtained by those skilled in the art according to these drawings without any creative effort. In the accompanying drawings.

Figure 1:
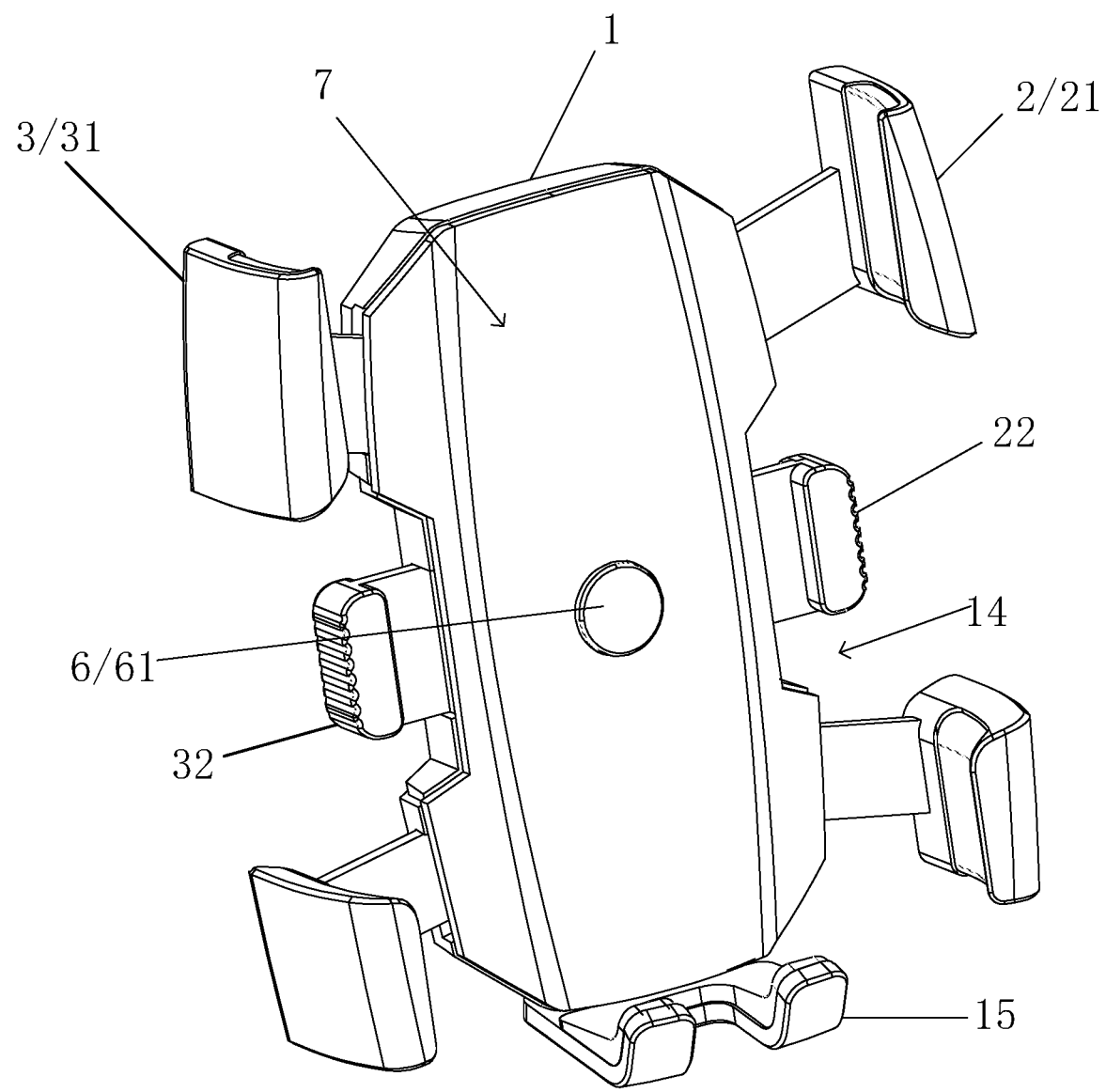
FIG. 1 is a schematic diagram of a holder in an embodiment of the present invention.

Reference numerals: 1, housing; 11, mounting base; 111, avoidance opening; 12, mounting column; 13, second sliding rail; 14, depression; 15, supporting arm; 2, first clamping arm; 21, first clamping part; 22, first pressing part; 23, first abutting part; 24, first sliding slot; 25, second sliding slot; 26, clamping opening; 3, second clamping arm; 31, second clamping part; 32, second pressing part; 33, limit slot; 34, second abutting part; 35, first sliding rail; 36, third sliding slot; 4, first elastic member; 5, second elastic member; 6, locking mechanism; 61, pressing key; 62, locking block; 621, limit column; 63, third elastic member; 7, clamping position.

DETAILED DESCRIPTION OF THE EMBODIMENTS

It should be understood that the terms used herein and the specific structural and functional details disclosed herein are merely intended to describe specific embodiments and are representative, but the present invention can be specifically realized in many alternative forms and should not be construed as being limited only to the embodiments elaborated herein.

The present invention will be described in details with reference to the accompanying drawings and optional embodiments below.

Figure 2:
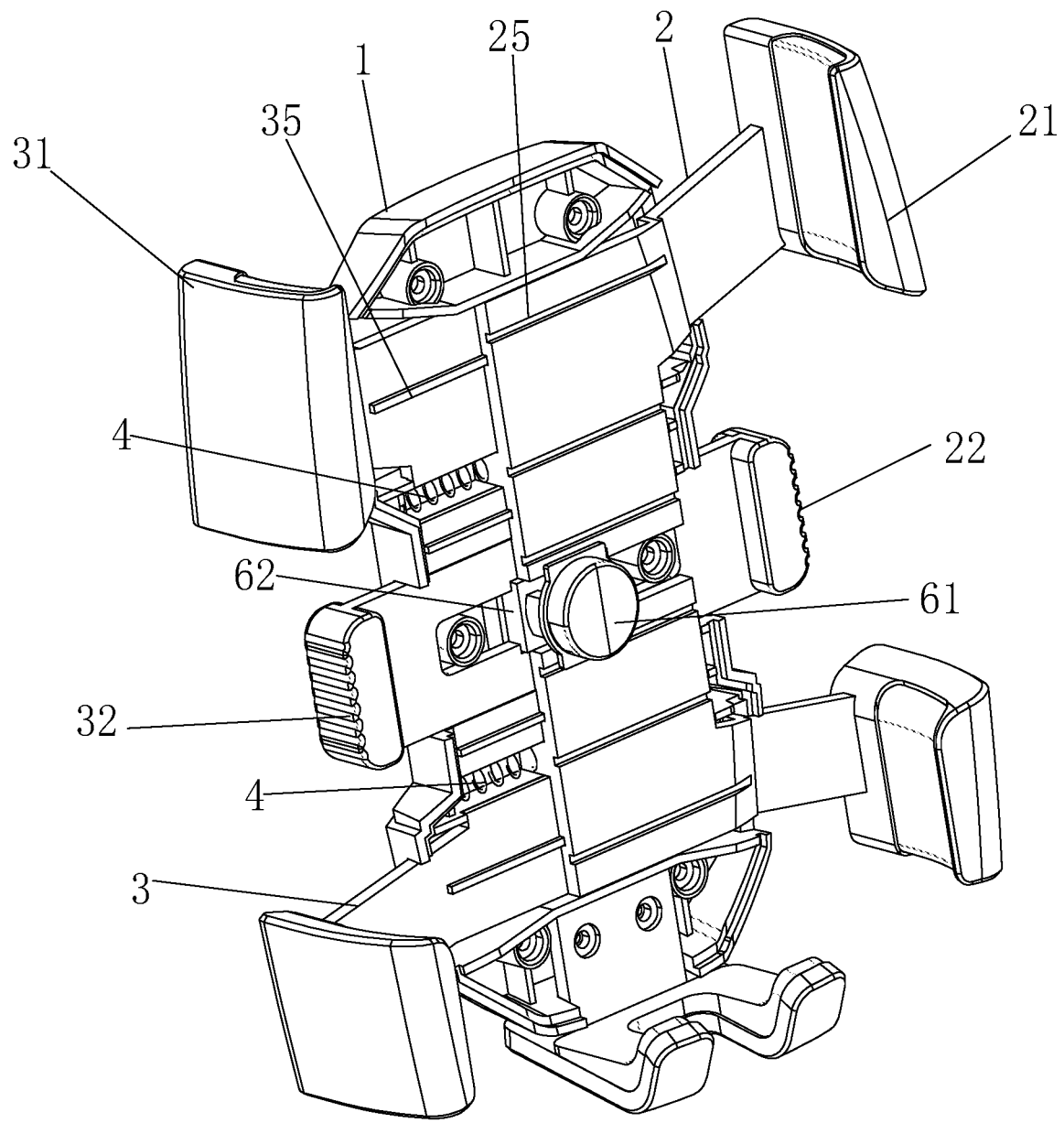
FIG. 2 is a schematic diagram of the inside of a holder in an embodiment of the present invention.
Figure 3:
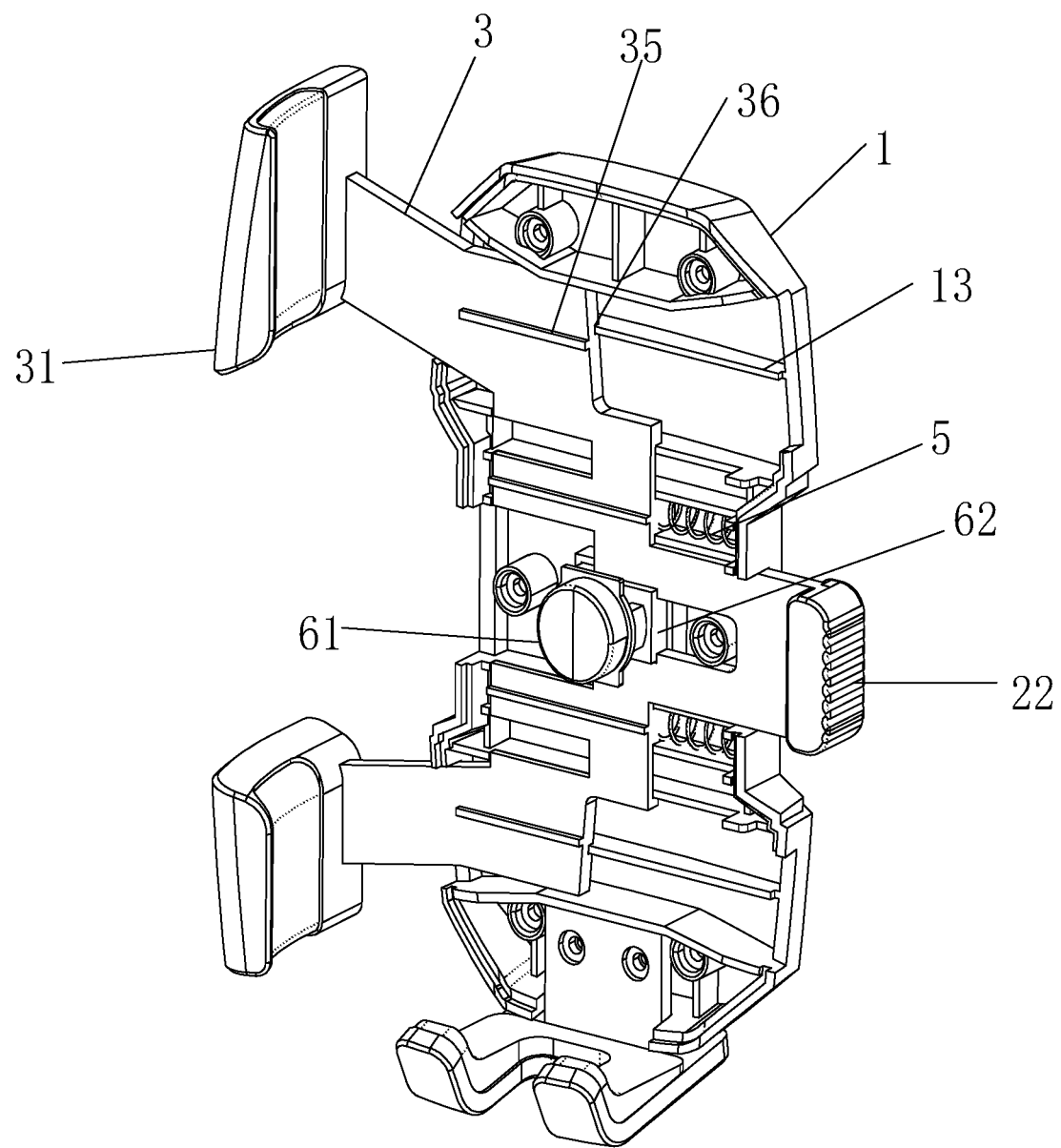
FIG. 3 is another schematic diagram of the inside of a holder in an embodiment of the present invention.

As shown in FIG. 1 to FIG. 3, as an embodiment of the present invention, a holder is disclosed, including a housing 1, a first clamping arm 2, a second clamping arm 3, a first elastic member 4 and a second elastic member 5. The bottom of the housing 1 is provided with a supporting arm 15. The first clamping arm 2 is movably mounted in the housing 1 and extends from one side of the housing 1 to form a first clamping part 21 and extends from the other side of the housing 1 to form a first pressing part 22. The second clamping arm 3 is movably mounted in the housing 1 and extends from one side of the housing 1 to form a second clamping part 31 and extends from the other side of the housing 1 to form a second pressing part 32; and the second clamping part 31 is opposite to the first clamping part 21. The first elastic member 4 is mounted in the housing 1 and is connected to the first clamping arm 2 to exert an elastic force towards the second clamping arm 3 on the first clamping arm 2. The second elastic member 5 is mounted in the housing 1 and connected to the second clamping arm 3 to exert an elastic force towards the first clamping arm 2 on the second clamping arm 3.

The first clamping arm 2, the second clamping arm 3 and the supporting arm 15 together limit a clamping position; the housing 1 is provided with a locking mechanism 6, the locking mechanism 6 is located in the clamping position; wherein, when the first pressing part 22 and the second pressing part 32 are pressed to open the first clamping arm 2 and the second clamping arm 3 to their maximum opening, the locking mechanism 6 locks the first clamping arm 2 and the second clamping arm 3, and the locking mechanism 6 is pressed to release the locking on the first clamping arm 2 and the second clamping arm 3.

As to the holder of the present invention, a user can press the first pressing part 22 and the second pressing part 32 simultaneously with one hand, thereby overcoming the elastic force of the first elastic member 4 and the second elastic member 5, such that the first clamping arm 2 and the second clamping arm 3 are opened. Moreover, when the first clamping arm 2 and the second clamping arm 3 are opened to the maximum opening, the locking mechanism 6 locks the first clamping arm 2 and the second clamping arm 3. At this time, the user can directly place the clamped objects such as a cell phone in a clamped position. The clamped objects such as a cell phone will be abutted against the locking mechanism 6 under the action of its own weight, and the locking mechanism 6 is pressed to release the locking on the first clamping arm 2 and the second clamping arm 3, and the first clamping arm 2 and the second clamping arm 3 will be reset under the action of the first elastic member 4 and the second elastic member 5, thereby clamping the clamped objects such as a cell phone. During the whole clamping process, the user can open the first clamping arm 2 and the second clamping arm 3 with one hand, and then use the self weight of the clamped objects such as a cell phone to abut against the locking mechanism 6 to achieve unlocking and clamping, thereby achieving operation and clamping with one hand, and the clamping is convenient.

The first elastic member 4 exerts an elastic force on the first clamping arm 2 towards the second clamping arm 3, such that the first clamping arm 2 is closed towards the second clamping arm 3 and provides a clamping force to clamp the clamped objects such as a cell phone. Similarly, the second elastic member 5 exerts an elastic force to the second clamping arm 3 towards the first clamping arm 2, such that the second clamping arm 3 is closed towards the first clamping arm 2 and provides a clamping force to clamp the clamped objects such as a cell phone.

Optionally, as shown in FIG. 2 to FIG. 5, the locking mechanism 6 includes a pressing key 61, a locking block 62 and a third elastic member 63; the pressing key is movably mounted on the housing 1, the locking block 62 and the third elastic member 63 are arranged in the housing 1, the third elastic member 63 is connected to the locking block 62 and the pressing key 61 is abutted against the locking block 62; the first clamping arm 2 is provided with a clamping opening 26; when the first clamping arm 2 is opened to a maximum opening, the locking block 62 is clamped into the clamping opening 26 under the action of the third elastic member 63, to lock the first clamping arm 2; and the pressing key 61 is pressed to push the locking block 62 to be separated from the clamping opening 26, to release the locking on the first clamping arm 2.

In the present solution, when the first clamping arm 2 and the second clamping arm 3 are opened to the maximum opening, the locking block 62 pops up and is clamped into the clamping opening 26 under the action of the third elastic member 63, the locking block 62 may be clamped with the clamping opening 26, to clamp the first clamping arm 2, so as to lock the first clamping arm 2. When the pressing key 61 is pressed, the pressing key 61 pushes the locking block 62 to overcome the elastic force of the third elastic member 63, the locking block 62 is separated from the clamping opening 26, and the locking of the first clamping arm 2 is released. The first clamping arm 2 is reset under the elastic force of the first elastic member 4 to clamp the cell phone and other clamped objects. The structure is simple, and locking and unlocking are reliable.

The clamping opening 26 is adapted to the shape of the locking block 62, the locking effect is good, and it is not easy to shake.

Figure 4:
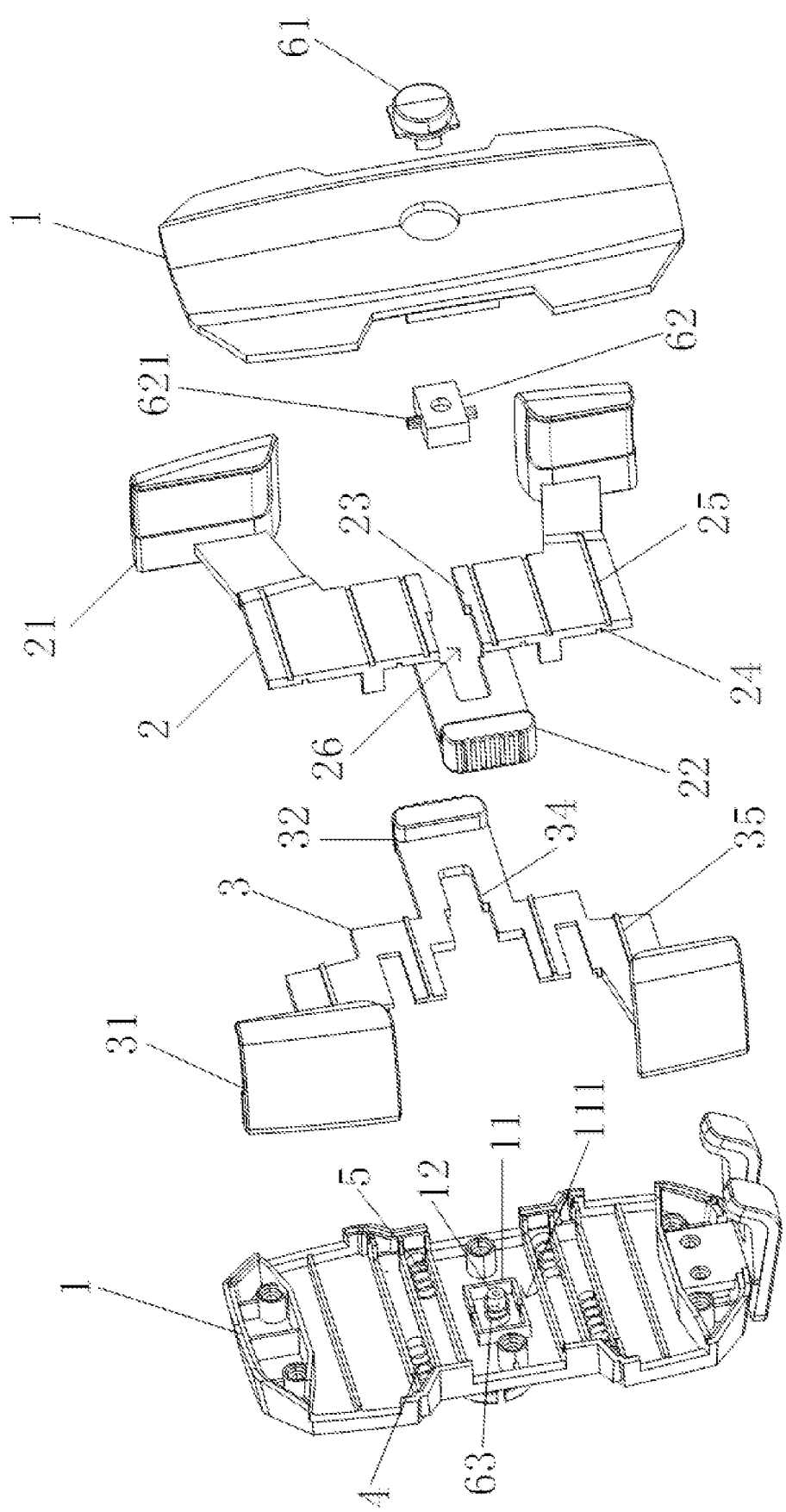
FIG. 4 is an exploded view of a holder in an embodiment of the present invention.
Figure 5:
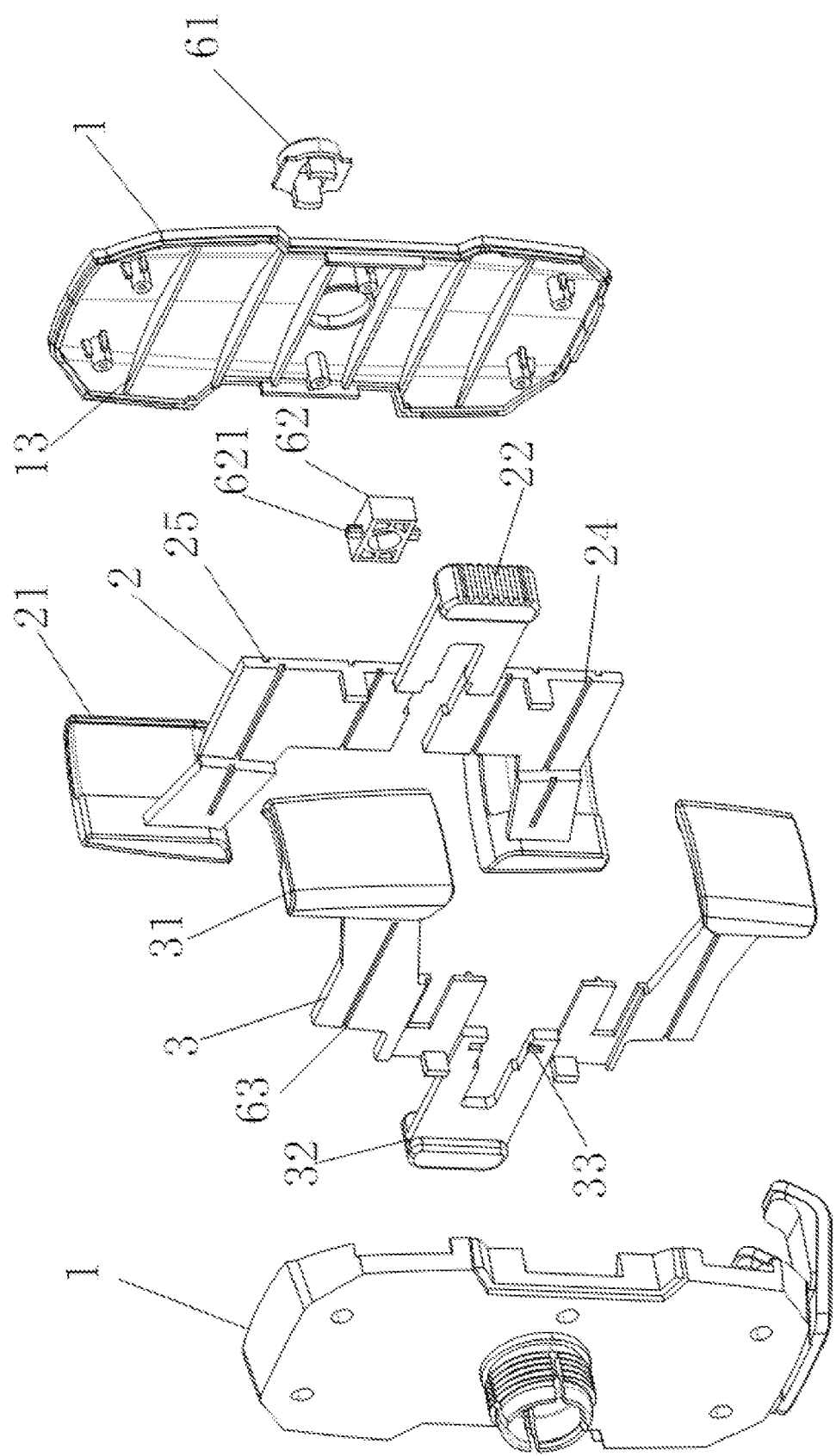
FIG. 5 is another exploded view of a holder in an embodiment of the present invention.

Optionally, as shown in FIGS. 4 to 5, the locking block 62 is provided with a limit column 621 and the second clamping arm 3 is provided with a limit slot 33; when the first clamping arm 2 and the second clamping arm 3 are opened to the maximum opening, the limit column 621 is clamped into the limit slot 33 under the action of the third elastic member 63 to lock the second clamping arm 3; the pressing key 61 is pressed to push the limit column 621 to be separated from the limit slot 33 to release the locking on the second clamping arm 3. In the present solution, when the first clamping arm 2 and the second clamping arm 3 are opened to the maximum opening, the limit column 621 pops up and is clamped into the limit slot 33 under the action of the third elastic member 63, so as to lock the second clamping arm 3. When the pressing key 61 is pressed, the pressing key 61 pushes the locking block 62 to overcome the elastic force of the third elastic member 63, the limit column 621 is separated from the limit slot 33, and the locking of the second clamping arm 3 is released. The second clamping arm 3 is reset under the elastic force of the second elastic member 5 to clamp the cell phone and other clamped objects. By locking the first clamping arm 2 by the locking block 62 itself and by locking the second clamping arm 3 by the limit column 621, the purpose of locking and unlocking the first clamping arm 2 and the second clamping arm 3 at the same time can be achieved, and the stroke the pressing key 61 and the locking block 62 is small, and unlocking is fast and convenient.

Optionally, as shown in FIGS. 4 to 5, a mounting base 11 is arranged in the housing 1, and a mounting column 12 is arranged in the mounting base 11; a third elastic member 63 is sleeved onto the mounting column 12, and a locking block 62 is movably mounted on the mounting column 12 and limited in the mounting base, and the locking block 62 is abutted against the third elastic member 63; an avoidance opening 111 is arranged on the mounting base 11, and a limit column 621 is arranged in the avoidance opening 111. In the present solution, the mounting base 11 can limit the locking block 62, and the locking block 62 can move up and down on the mounting column 12 and pop up under the action of the third elastic member 63. The avoidance opening 111 can avoid the limit column 621 and allow the locking block 62 to be contracted in the mounting base 11 when the locking block 62 is compressed.

Optionally, as shown in FIG. 4 to FIG. 5, the first clamping arm 2 is provided with a first abutting part 23; after the first clamping arm 2 is unlocked, the first abutting part 23 is abutted against the locking block 62. In the present solution, after the first clamping arm 2 is unlocked, the first abutting part 23 may be abutted against the locking block 62, the third elastic member 63 is compressed, and the locking block 62 is in a compressed state, thereby facilitating the first clamping arm 2 to slide. Meanwhile, under the action of the elastic force of the third elastic member 63, the locking block 62 may be abutted against the first abutting part 23, to play a role of compressing the first clamping arm 2, and the first clamping arm 2 is not easy to shake.

Optionally, the second clamping arm 3 is provided with a second abutting part 34; after the second clamping arm 3 is unlocked, the second abutting part 34 is abutted against the limit column 621. In the present solution, after the second clamping arm 3 is unlocked, the second abutting part 34 may be abutted against the limit column 621, the third elastic member 63 is compressed, and the locking block 62 is in a compressed state, thereby facilitating the second clamping arm 3 to slide. Meanwhile, under the action of the elastic force of the third elastic member 63, the limit column 621 may be abutted against the second abutting part 34, to play a role of compressing the second clamping arm 3, and the second clamping arm 3 is not easy to shake.

Optionally, the first clamping arm 2 is arranged to be laminated on the second clamping arm 3; the first clamping arm 2 is provided with a first sliding slot 24; the second clamping arm 3 is provided with a first sliding rail 35; and the first sliding rail 35 is embedded into the first sliding slot 24. In the present solution, the cooperation between the first sliding rail 35 and the first sliding slot 24 may play a role of limiting, and the first clamping arm 2 and the second clamping arm 3 are not easy to shake; the cooperation can also play a role of guiding and positioning, and the sliding direction of the first clamping arm 2 and the second clamping arm 3 is fixed; the position between the first clamping arm 2 and the second clamping arm 3 is also relatively fixed, and relative movement does not easily occur. Specifically, the first sliding rail 35 and the first sliding slot 24 are strip-shaped. Multiple first sliding rails 35 can be arranged, and correspondingly, the first sliding slot 24 is arranged corresponding to the first sliding rail 35.

Optionally, the housing 1 is provided with a second sliding rail 13, the first clamping arm 2 is provided with a second sliding slot 25, and the second clamping arm 3 is provided with a third sliding slot 36; the second sliding rail 13 is embedded into the second sliding slot 25 and the third sliding slot 36. In the present solution, the cooperation between the second sliding rail 13, the second sliding slot 25 and the third sliding slot 36 can play a role of limiting, and the first clamping arm 2, the second clamping arm 3 and the housing are not easy to shake; the cooperation can also play a role of guiding and positioning, and the sliding direction of the first clamping arm 2 and the second clamping arm 3 is fixed; the position between the first clamping arm 2 and the housing 1 and between the second clamping arm 3 and the housing 1 is also relatively fixed, and relative movement does not easily occur. Specifically, the second sliding rail 13, the second sliding slot 25 and the third sliding slot 36 are strip-shaped. Multiple second sliding rails 13 can be arranged, and correspondingly, the second sliding slot 25 and the third sliding slot 36 are arranged corresponding to the first sliding rail 35.

Optionally, the housing 1 is provided with a depression 14 at the position corresponding to the first pressing part 22 and the second pressing part 32. The depression 14 can avoid the hand of the user and facilitate the user to press the pressing part.

Optionally, an anti-slip slot is arranged on a side, deviating from the housing 1, of the first pressing part 22 and the second pressing part 32. In the present solution, the anti-slip slot can increase the friction force during pressing.

Optionally, two first clamping parts 21 and two second clamping parts 31 are available; the first pressing part 22 is arranged between the two second clamping parts 31, and the second pressing part 32 is arranged between the two first clamping parts 21. In the present solution, the first pressing part 22 is arranged between two second clamping parts 31, the second pressing part 32 is arranged between two first clamping parts 21, that is, the first pressing part 22 is arranged between two first clamping parts 21, the second pressing part 32 is arranged between two second clamping parts 31, when the first pressing part 22 and the second pressing part 32 are pressed, the first clamping arm 2 and the second clamping arm 3 are more evenly stressed, and the first clamping arm 2 and the second clamping arm 3 are pressed in an easier and more labor-saving manner.

The above is a further detailed description of the present invention in combination with specific optional execution modes, and it cannot be assumed that the specific implementation of the present invention is limited to these descriptions. For those skilled in the art of the present invention, without departing from the premise of the concept of the present invention, a number of simple derivations or substitutions can be made, all of which should be regarded as falling within the protection scope of the present invention.

What is claimed is:

1. A holder, comprising:
a housing, with the bottom being provided with a supporting arm;
a first clamping arm, movably mounted in the housing and extending from one side of the housing to form a first clamping part and extending from the other side of the housing to form a first pressing part;
a second clamping arm, movably mounted in the housing and extending from one side of the housing to form a second clamping part and extending from the other side of the housing to form a second pressing part; wherein the second clamping part is opposite to the first clamping part;
a first elastic member, mounted in the housing and connected to the first clamping arm to exert an elastic force towards the second clamping arm on the first clamping arm;
a second elastic member, mounted in the housing and connected to the second clamping arm to exert an elastic force towards the first clamping arm on the second clamping arm; and
the first clamping arm, the second clamping arm and the supporting arm together limit a clamping position; the housing is provided with a locking mechanism, the locking mechanism is located in the clamping position; wherein, when the first pressing part and the second pressing part are pressed to open the first clamping arm and the second clamping arm to their maximum opening, the locking mechanism locks the first clamping arm and the second clamping arm, and the locking mechanism is pressed to release the locking on the first clamping arm and the second clamping arm.

2. The holder of claim 1, wherein the locking mechanism comprises a pressing key, a locking block and a third elastic member; the pressing key is movably mounted on the housing, the locking block and the third elastic member are arranged in the housing, the third elastic member is connected to the locking block and the pressing key is abutted against the locking block; the first clamping arm is provided with a clamping opening; when the first clamping arm is opened to a maximum opening, the locking block is clamped into the clamping opening under the action of the third elastic member, to lock the first clamping arm; and the pressing key is pressed to push the locking block to be separated from the clamping opening, to release the locking on the first clamping arm.

3. The holder of claim 2, wherein the locking block is provided with a limit column and the second clamping arm is provided with a limit slot; when the first clamping arm and the second clamping arm are opened to the maximum opening, the limit column is clamped into the limit slot under the action of the third elastic member to lock the second clamping arm; the pressing key is pressed to push the limit column to be separated from the limit slot to release the locking on the second clamping arm.

4. The holder of claim 3, wherein the housing is provided with a mounting base, the mounting base is provided with a mounting column; the third elastic member is sleeved onto the mounting column, the locking block is movably mounted on the mounting column and limited in the mounting column, the locking block is abutted against the third elastic member; the mounting base is formed with an avoidance opening, and the limit column is located in the avoidance opening.

5. The holder of claim 2, wherein the first clamping arm is provided with a first abutting part; and after the first clamping arm is unlocked, the first abutting part is abutted against the locking block.

6. The holder of claim 3, wherein the second clamping arm is provided with a second abutting part; and after the second clamping arm is unlocked, the second abutting part is abutted against the limit column.

7. The holder of claim 1, wherein the first clamping arm is arranged to be laminated on the second clamping arm; the first clamping arm is provided with a first sliding slot; the second clamping arm is provided with a first sliding rail; and the first sliding rail is embedded into the first sliding slot.

8. The holder of claim 7, wherein the housing is provided with a second sliding rail, the first clamping arm is provided with a second sliding slot, the second clamping arm is provided with a third sliding slot, and the second sliding rail is embedded between the second sliding slot and the third sliding slot.

9. The holder of claim 1, wherein the housing is provided with a depression at the position corresponding to the first pressing part and the second pressing part.

10. The holder of claim 1, wherein two first clamping parts and two second clamping parts are available; the first pressing part is arranged between the two second clamping parts, and the second pressing part is arranged between the two first clamping parts.

* * * * *